US012060968B2

(12) United States Patent
Belanger

(10) Patent No.: US 12,060,968 B2
(45) Date of Patent: Aug. 13, 2024

(54) SOLAR RADIATION MITIGATION SYSTEM

(71) Applicant: Nancy Belanger, Cacouna (CA)

(72) Inventor: Nancy Belanger, Cacouna (CA)

( * ) Notice: Subject to any disclaimer, the term of this patent is extended or adjusted under 35 U.S.C. 154(b) by 656 days.

(21) Appl. No.: 17/298,242

(22) PCT Filed: Jan. 2, 2020

(86) PCT No.: PCT/CA2020/050003
§ 371 (c)(1),
(2) Date: May 28, 2021

(87) PCT Pub. No.: WO2020/140154
PCT Pub. Date: Jul. 9, 2020

(65) Prior Publication Data
US 2022/0087378 A1   Mar. 24, 2022

Related U.S. Application Data

(60) Provisional application No. 62/788,108, filed on Jan. 3, 2019.

(51) Int. Cl.
*A45B 23/00* (2006.01)
*A45B 11/00* (2006.01)
(Continued)

(52) U.S. Cl.
CPC ............. *F16M 11/40* (2013.01); *A45B 11/00* (2013.01); *A47C 7/66* (2013.01); *F16M 13/022* (2013.01);
(Continued)

(58) Field of Classification Search
CPC ............ A45B 23/00; A45B 2023/0093; A45B 2023/006
See application file for complete search history.

(56) References Cited

U.S. PATENT DOCUMENTS 2,598,588 A * 5/1952 Hopkins ................ A45B 23/00
52/165
4,962,780 A * 10/1990 Engdahl ................ A45B 25/02
135/16
(Continued)

FOREIGN PATENT DOCUMENTS

| CN | 201484137 U | 5/2010 |
| WO | 94/08810 A1 | 4/1994 |
| WO | 2015/103639 A1 | 7/2015 |

OTHER PUBLICATIONS

International Search Report of PCT/CA2020/050003, Search Completed on Mar. 2, 2020, Authorized Officer Jason Jarjoura, 4 pages.

*Primary Examiner* — Noah Chandler Hawk
(74) *Attorney, Agent, or Firm* — BCF LLP

(57) ABSTRACT

The present technology generally relates to a solar radiation mitigation system mountable to a furniture element. The solar radiation mitigation system has a panel assembly. The panel assembly has a first panel capable of blocking a first radiation amount, and a second panel in operational relation with the first panel. The second panel blocks a second radiation amount. The panel assembly blocks a combined radiation amount greater than the first and second radiation amounts when the first and second panels are in operational relation. The solar radiation mitigation system comprises at least one adjustable arm comprising a distal arm connector connected to the first panel, a proximal arm connector being detachably attachable to the furniture element for mounting the system to the furniture element, and an elongated member extending from the proximal arm connector to the distal arm connector. The elongated member is adjustable to position and orient the first panel with respect to the furniture element.

19 Claims, 15 Drawing Sheets

(51) Int. Cl.
*A47C 7/66* (2006.01)
*F16M 11/40* (2006.01)
*F16M 13/02* (2006.01)
F25D 31/00 (2006.01)
H02S 40/38 (2014.01)

(52) U.S. Cl.
CPC ........... *A45B 2023/0006* (2013.01); *A45B 2023/0093* (2013.01); *A45B 2200/1027* (2013.01); *A45B 2200/1036* (2013.01); *F25D 31/006* (2013.01); *H02S 40/38* (2014.12)

(56) References Cited

U.S. PATENT DOCUMENTS

| | | | | |
|---|---|---|---|---|
| 5,033,528 | A | * | 7/1991 | Volcani ............ F16M 11/40 403/56 |
| 5,333,665 | A | * | 8/1994 | Safar ............... B60J 1/2091 160/84.05 |
| 5,397,268 | A | * | 3/1995 | Chang .............. F24F 7/065 454/370 |
| 6,173,725 | B1 | * | 1/2001 | Garth ............... A47C 7/66 280/47.38 |
| 6,293,292 | B1 | * | 9/2001 | Watzke ............. A47C 7/66 135/96 |
| 6,668,407 | B1 | | 12/2003 | Reitzel |
| 9,970,212 | B2 | * | 5/2018 | Summers ........... A45B 11/00 |
| 10,352,063 | B2 | * | 7/2019 | Jensen ............. E04H 15/60 |
| 2009/0139669 | A1 | * | 6/2009 | Robin ............... A45B 11/00 24/457 |
| 2012/0049562 | A1 | | 3/2012 | Mowder et al. |
| 2014/0097652 | A1 | | 4/2014 | Minkoff et al. |
| 2016/0010358 | A1 | | 1/2016 | Ashley |

* cited by examiner

SOLAR RADIATION MITIGATION SYSTEM

CROSS-REFERENCE TO RELATED APPLICATIONS

This application is a national phase filing under 35 U.S.C. 371 of International Application No. PCT/CA2020/050003, filed on Jan. 2, 2020, which claims the benefit of U.S. Patent Application No. 62/788,108, filed on Jan. 3, 2019. The contents of the aforementioned applications are incorporated by reference in their entirety herein.

FIELD OF TECHNOLOGY

The present technology generally relates to the field of shading technologies. More specifically, the present technology relates to shading technologies for human use in locations exposed to solar radiations.

BACKGROUND INFORMATION

Direct and prolonged exposure to solar radiations is known to cause undesirable effects to humans. Such effects range from mere inconveniences (e.g., tan lines) to serious health issues (e.g., sunburns, sunstrokes), and may even lead to skin cancer. As some people enjoy lounging outdoors despite the risks of doing so, there is a need for solutions enabling such people to carryout their leisurely activities under the sun in a safe manner.

Several means of protection are commonly used, alone or in combination, to mitigate the aforementioned effects. Such means include protecting one's skin via protective clothing or sunscreen, and shielding oneself in the shadow cast by a known conventional shading device such as an umbrella.

Shading devices are particularly useful in environments subjected to direct and prolonged sun exposure such as waterfront locations as well as driver and passenger seats onboard road vehicles. However, known conventional shading devices provide very little benefits outside of specific conditions of use. For example, a well-positioned beach umbrella or vehicle sunshade panel will provide the expected benefits up until the position of the sun has changed and radiation emitted by the sun is no longer intercepted. Other known conventional shading devices feature a shading portion connected to a deformable mounting means, the latter allowing incremental manual adjustment of the position of the shading portion with respect to the sun as the position of the sun changes throughout the day. However, such known conventional shading devices must be positioned within arms length of the user in order to remain adjustable, which renders them prone to hinder visibility. Further practicality concerns are raised by the irregular shape and bulkiness of such shading devices, particularly when contemplating packing them together with other items for use in remote locations. Furthermore, some people enjoying lounging outdoors may find that the disadvantages of carrying such known conventional shading devices with them outweigh the benefits, especially considering that on-site furniture or natural canopy may provide imperfect yet acceptable protection from the sun.

In light of the aforementioned, improvements in the field of shading technologies are desirable.

SUMMARY OF TECHNOLOGY

It is an object of the present technology to ameliorate at least some of the inconveniences present in the prior art.

In one aspect, embodiments of the present technology provide a solar radiation mitigation system. The solar radiation mitigation system is mountable to a furniture element. The solar radiation mitigation system comprises a panel assembly comprising a first panel constructed of a material capable of blocking a first amount of solar radiation, and a second panel in operational relation with the first panel and detachably connected thereto. The second panel is made from a material capable of blocking a second amount of solar radiation. Wherein, the panel assembly blocks a combined amount of solar radiation greater than the first amount and the second amount of solar radiation when the second panel is in operational relation with the first panel. The solar mitigation system comprises at least one adjustable arm comprising a distal arm connector connected to the first panel, a proximal arm connector structured to be detachably attachable to the furniture element for mounting the solar radiation mitigation system to the furniture element, and an elongated member extending from the proximal arm connector to the distal arm connector, the elongated member being adjustable to position and orient the first panel with respect to the furniture element.

In some embodiments, when in operational relation, the first panel and the second panel are superimposed.

In some embodiments, the solar radiation mitigation system is an outdoor solar radiation mitigation system. In some such embodiments, the furniture element is an outdoor furniture element.

In some embodiments, the panel assembly and the at least one adjustable arm are arranged such that the first panel and the second panel form a sleeve, and when the proximal arm connector is unattached, the at least one adjustable arm is stowable within the sleeve.

In some embodiments, at least one of the first and second panels includes an optical filter for selectively transmitting incident light.

In some embodiments, when in operative relation, the second panel adopts one of at least two angular positions with respect to the first panel. In some such embodiments, the at least two angular positions include a first angular position and a second angular position. In some such embodiments, the first angular position is orthogonal with respect to the second angular position.

In some embodiments, the combined amount of solar radiation is between about 90% and 99%, or between about 93% and about 98%, or between about 96% and 98%.

In some embodiments, the combined amount of solar radiation is at least 93.0% or at least 93.3% of solar radiation directly incident with respect to the panel assembly.

In some embodiments, the combined amount of solar radiation is at least about 96% of solar radiation directly incident with respect to the panel assembly.

In some embodiments, the combined amount of solar radiation is at least 97.5% of solar radiation directly incident with respect to the panel assembly.

In some embodiments, at least a portion of the second panel is a flying disc toy.

In some embodiments, the solar radiation mitigation system further comprises a portable, electrically-powered fan connected to an adjustable arm, the adjustable arm being adjustable to position and orient the fan with respect to the furniture element when the solar radiation system is mounted thereto.

In some embodiments, the panel assembly further comprises a photovoltaic system comprising a photovoltaic panel being attachable alongside and forming part of one of the first panel and the second panel, and a battery pack being electrically connected to the photovoltaic panel to store solar electricity generated by the photovoltaic panel, the battery pack being structured to be capable of powering a portable electronic device.

In some embodiments, one of the first panel and the second panel defines a planar surface and includes at least one receptacle sized for receiving a beverage container, the at least one receptacle projecting outwardly of the planar surface. In some such embodiments, the at least one receptacle is structured to be collapsible toward the planar surface.

In other such embodiments, the at least one receptacle has an outer portion and a connector disposed on the outer portion, the one of the first panel and the second panel being detachably attachable to a remaining one of the first panel and the second panel via the connector.

In other such embodiments, the panel assembly further comprises a cooling conduit, the cooling conduit being fluidly connectable to a pump, the cooling conduit being structured to allow transferring of heat from the at least one receptacle to a fluid circulated along the cooling conduit by the pump.

In other such embodiments, the at least one receptacle is constructed of at least one material being a refrigerant material.

In some embodiments, the panel assembly further comprises a third panel in operational relation with at least one of the first panel and the second panel and detachably connected thereto, the third panel being made of a material capable of blocking a third amount of solar radiation.

In some such embodiments, one of the first panel, the second panel and the third panel defines a planar surface and includes at least one receptacle sized for receiving a beverage container, the at least one receptacle projecting outwardly from the planar surface.

In other such embodiments, at least a portion of one of the second panel and the third panel is a flying disc toy.

In some embodiments, the solar radiation mitigation system further comprises an electrically-powered speaker connectable to at least one of the panel assembly and the at least one adjustable arm.

In some embodiments, one of the first panel and the second panel defines a planar surface and includes at least one speaker, the at least one speaker defining a concave structure projecting outwardly of the planar surface, the concave structure being collapsible toward the planar surface.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first panel" and "third panel" is not intended to imply any particular order, type, chronology, hierarchy or ranking (for example) of/between panels, nor is their use (by itself) intended imply that any "second panel" must necessarily exist in any given situation. Further, as is discussed herein in other contexts, reference to a "first" element and a "second" element does not preclude the two elements from being the same actual real-world element. Thus, for example, in some instances, a "first" panel and a "second" panel may be portions of a same article of manufacture, and in other cases they may be distinct articles of manufacture.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
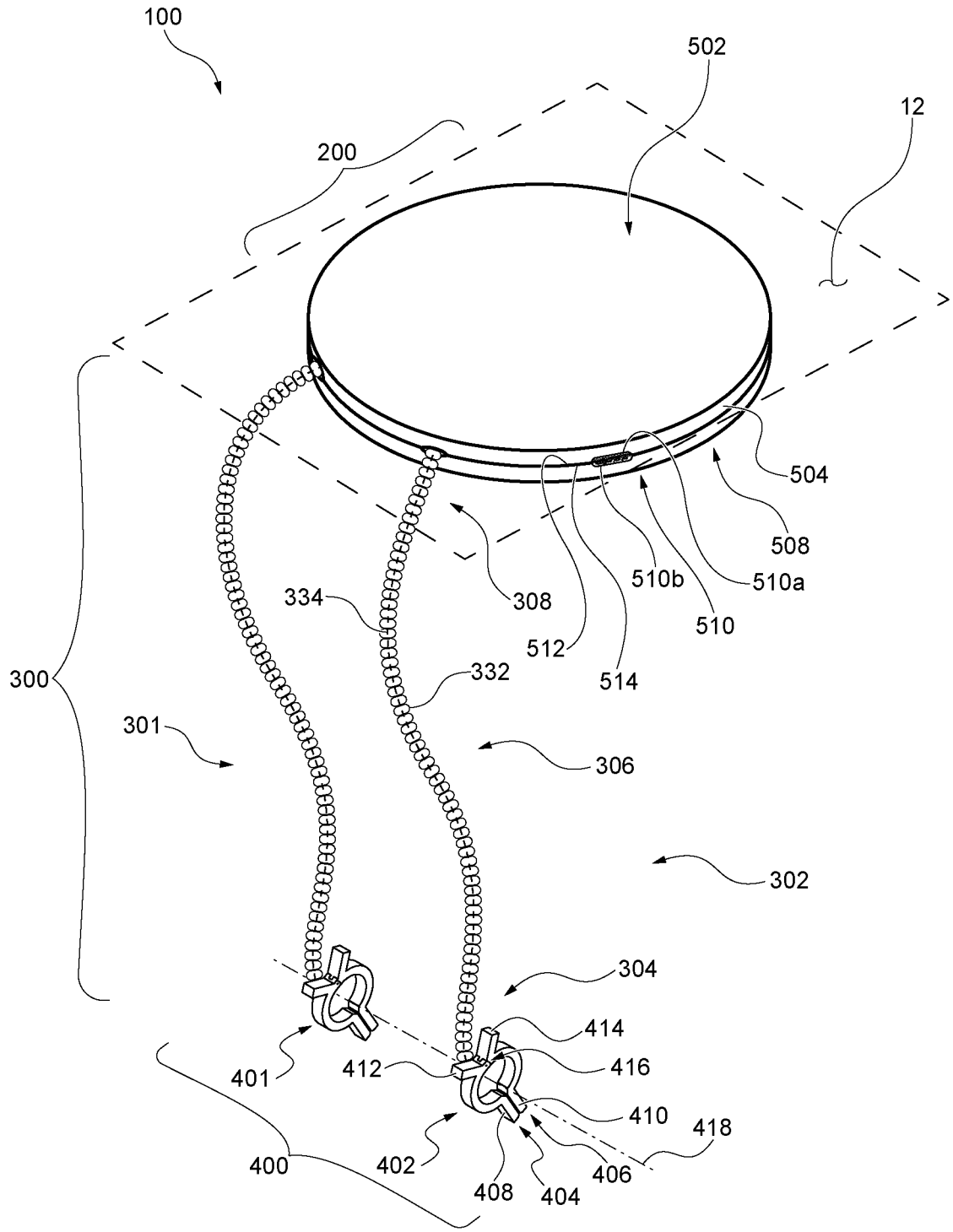
FIG. 1 is a perspective view taken from a rear, right, top side of a solar radiation mitigation system according to a first embodiment of the present technology, shown mounted to a chair.

A novel solar radiation mitigation system will be described hereinafter. Although the technology is described in terms of specific illustrative embodiments, it is to be understood that the embodiments described herein are by way of example only and that the scope of the technology is not intended to be limited thereby.

Solar radiation mitigation systems according to the present technology, for the most part, define a symmetry plane and comprise paired elements disposed on left and right sides of the symmetry plane. For example, a solar radiation mitigation system 100 according to a first embodiment of the present technology comprises a panel assembly 200, left (301) and right (302) arms 300, as well as left (401) and right (402) connectors 400. The left and right arms 301, 302 extend outwardly of the panel assembly 200 to the left and right connectors 401, 402, respectively. Although it is contemplated that a solar radiation mitigation system according to the present technology may comprise a single, centrally-disposed arm and connector structure, systems comprising paired, symmetrically-disposed left and right arms 301, 302 as well as left and right connectors 401, 402 are deemed desirable for use under circumstances which will be described hereinbelow. In order to streamline the forthcoming description, right counterparts of paired, symmetrically-disposed elements will be described in detail, and descriptions of left counterparts thereof, being identical yet oft-hidden from view in the figures, will be largely omitted. Further, redundant description of like parts in multiple embodiments will also be omitted.

Figure 3:
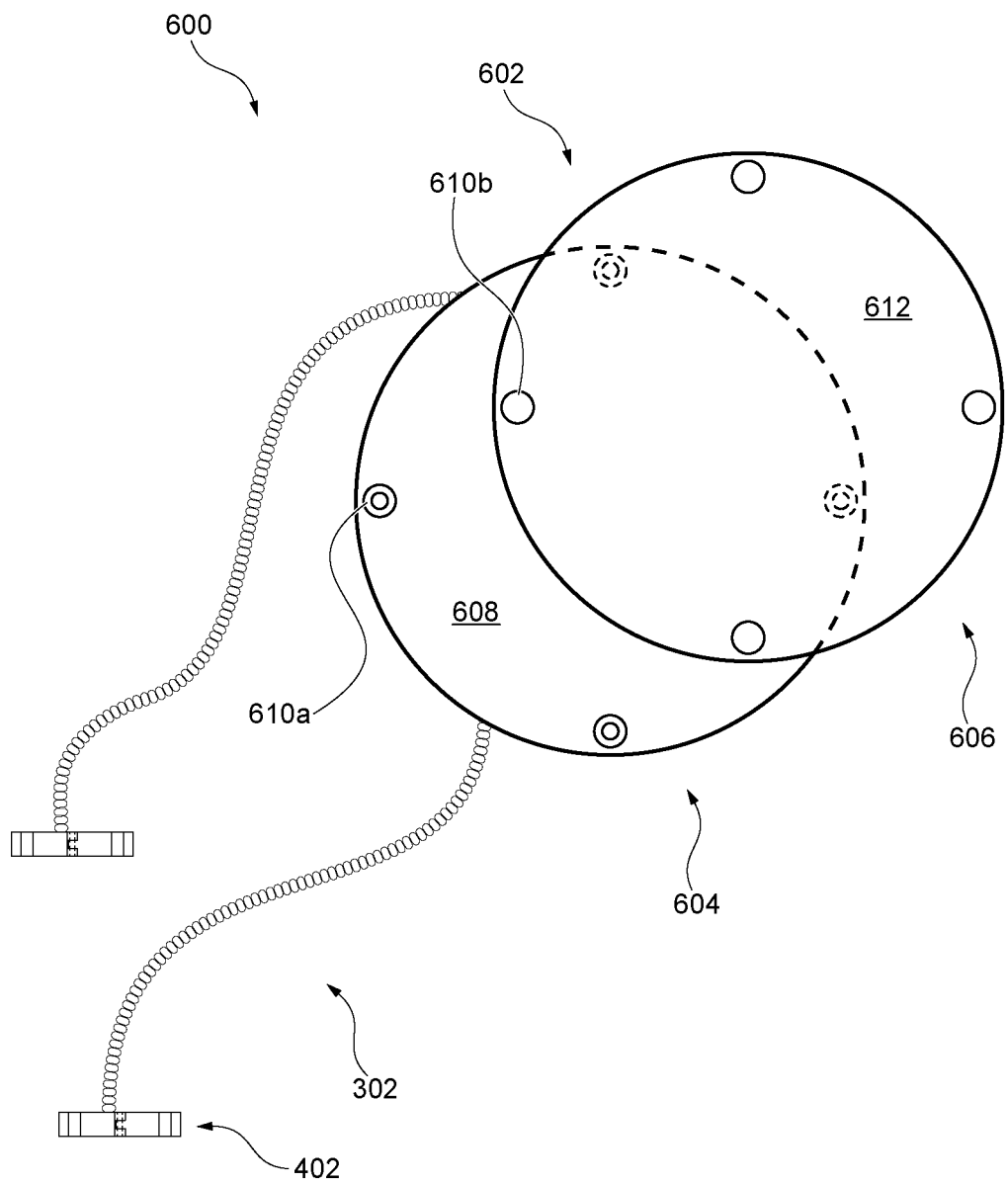
FIG. 3 is a top plan view of a solar radiation mitigation system according to a second embodiment of the present technology, shown with a second panel thereof being detached from a first panel thereof.
Figure 8:
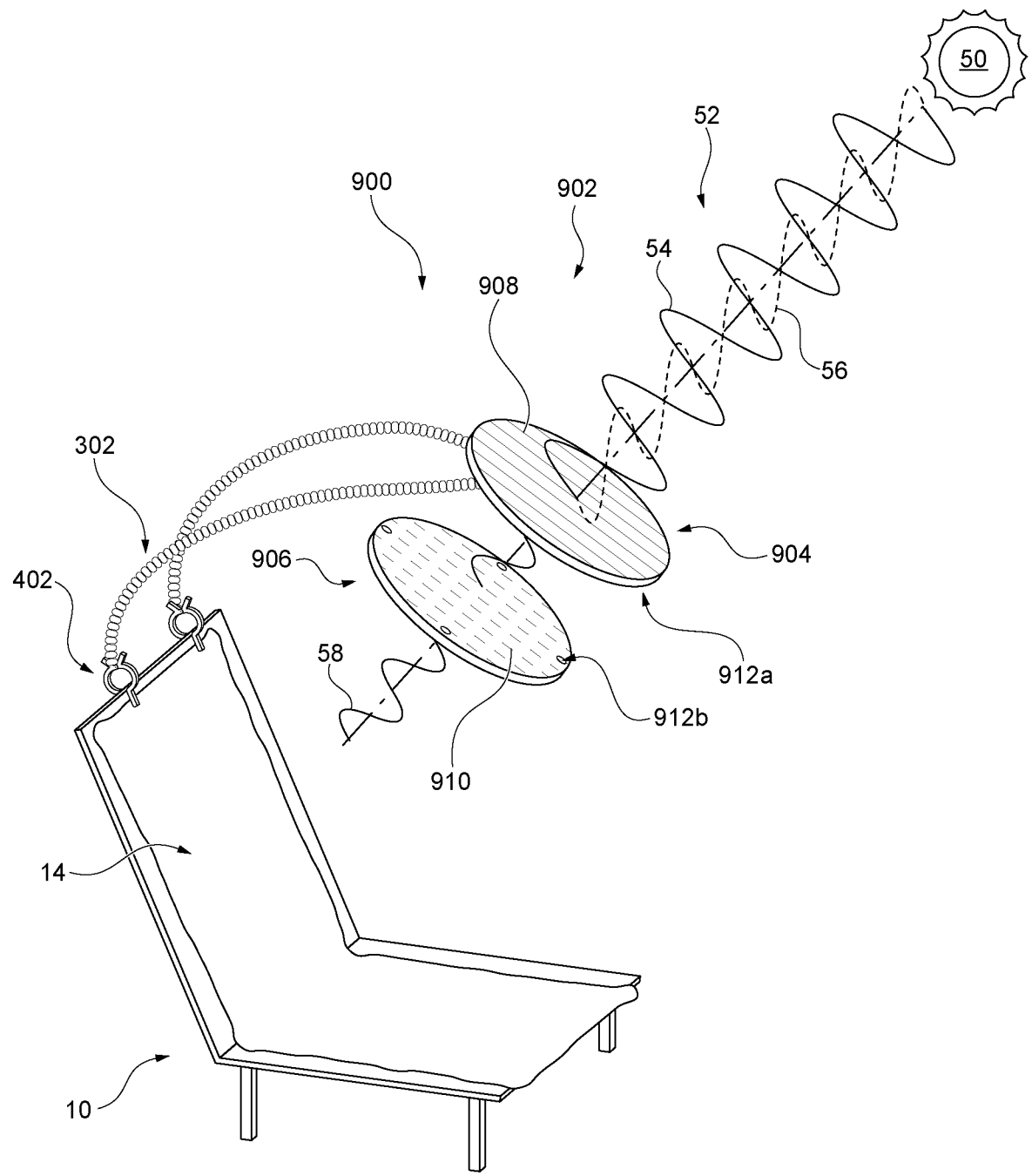
FIG. 8 is a perspective view taken from a front, right, top side of the solar radiation mitigation system of FIG. 6, shown mounted to a chair, the first and second panels facing incident solar radiation, the first-panel and second-panel polarization orientation being parallel.

Still referring to FIG. 1, the solar radiation mitigation system 100 is mountable onto a furniture element such as a backrest of a chair 10 (shown in FIG. 8). The chair 10 is an outdoor lounging chaise typically found in vacation resorts either on beaches or poolside. It is contemplated that the solar radiation mitigation system 100 is also mountable to a vehicle via a head restraint, a sunshade pane or a window pane thereof (not shown). The solar radiation mitigation system 100 comprises a mechanical connector 402 structured to be mountable to various types of furniture such as the chair 10. In this embodiment, the connector 40 is a clamp 402, although it should be understood that, alternatively, the connector 402 may be structured otherwise such as, the following being non-limiting examples, a strap, a vise and a different type of clamp. As best seen in FIG. 3, the connector 402 includes a first connector portion 404 and a second connector portion 406. Each connector portion 404, 406 has one of two opposable jaws 408, 410 and one of two tabs 412, 414. The tabs 412, 414 project longitudinally outwardly from the jaws 408, 410. The connector portions 404, 406 are pivotably connected to one another via a biasing mechanism 416 for pivoting with respect to one another about a pivot axis 418. The biasing mechanism 416 is structured such that the jaws 408, 410 are biased laterally inwardly toward one another. When the jaws 408, 410 are disposed against one another, the tabs 412, 414 diverge laterally away from one another. Forcing the tabs 412, 414 laterally inwardly toward one another causes the jaws 408, 410 to be forced apart, thereby creating space to dispose an object therebetween, such as an upper border of the chair 10, for mounting the solar radiation mitigation system 100 thereto. Naturally, releasing the tabs 412, 414 frees the biasing mechanism 416, thereby causing the jaws 408, 410 to clamp the object disposed therebetween.

The solar radiation mitigation system 100 further comprises the adjustable arm 302 projecting longitudinally outward from the clamp 402 adjacent to the first tab 412. The adjustable arm 302 has a proximal arm portion 304 connected to the clamp 402 adjacent to the first tab 412, a middle arm portion 306 extending longitudinally from the proximal arm portion 304, and a distal arm portion 308 spaced from the proximal arm portion 304 by the middle arm portion 306. The adjustable arm 302 is joined to the panel assembly 200 via the distal arm portion 308.

The middle arm portion 306 includes an outer jacket 332 having a hollow, tube-like structure, and an inner rod 334 (shown in dashed lines) extending longitudinally within the outer jacket 332. The inner rod 334 is constructed of a resistant, yet deformable material when under moderate, single-handedly exerted loads. Non-limiting examples include steel, aluminum, copper and metallic alloys. The outer jacket 332 is structured with respect to the inner rod 334 so as to restrain bending of the inner rod 334 and limit deformation thereof, allowing a high number of deformation cycles at any given point of inflexion along the inner rod 334. As the construction of the adjustable arm 302 is not central to the present technology, it will not be described in further detail.

The distal arm portion 308 is joined to a first panel 502 of the panel assembly 200. The first panel 502 has an outer border 504, and the distal arm portion 308 is joined at a rearward, right-side portion thereof. In this embodiment, the first panel 502 and the distal arm portion 308 are structured and arranged one with respect to the other such that the distal arm portion 308 is embedded into the structure of the first panel 502 (not shown in detail), thereby mechanically retaining the distal arm portion 308 therein. Alternatively, the distal arm portion 308 could be joined to an outer portion of the first panel 502. Non-limiting examples of alternate means for joining the distal arm portion 308 to the first panel 502 include fasteners, magnets and adhesives. The first panel 502 has a flat structure defining an imaginary plane 12. The distal arm portion 308 is joined to the first panel 502 so as to extend toward the first panel 502 tangentially to the plane 12, although it does not have to be the case. It is contemplated that, in some embodiments, the distal arm portion 308 is joined to the first panel 502 so as to define an angle smaller than 180 degrees with respect to the plane 12.

It is contemplated that, in some embodiments, the distal arm portion 308 may form a first portion of a distal connector, and the rearward right-side portion of the outer border of first panel 502 may form a second portion of the distal connector. In some such embodiments, the distal connector is a pivotable connector structured for pivoting the adjustable arm 302 with respect to the first panel 502 about an axis oriented toward the middle arm portion 330.

The first panel 502 is constructed of a material capable of blocking at least a portion of solar radiation in the ultraviolet (UV) spectrum and at least a portion of solar radiation in the visible light spectrum. In some embodiments, the material is a fabric capable of blocking a first amount of incident UV radiation being between about 90% and 99%, or between about 93% and about 98%, or between about 96% and 98%.

In some embodiments, the combined amount of solar radiation is at least 93.0% or at least 93.3% of solar radiation directly incident with respect to the panel assembly.

In some embodiments, the combined amount of solar radiation is at least about 96% of solar radiation directly incident with respect to the panel assembly.

In some embodiments, the combined amount of solar radiation is at least 97.5% of solar radiation directly incident with respect to the panel assembly.

In other embodiments, the material is a fabric capable of blocking a first amount of incident UV radiation being at least 93.3%, i.e., an Ultraviolet Protection Factor (UPF) rating of 15. The material also has at least one of the following characteristics: high-density weave, dark color, UV-absorptive coating, and water repellence. It is contemplated that the material lets through a material amount of radiation in the visible light spectrum, and is therefore see-through when used in an outdoor setting under normal natural day-time lighting conditions.

The first panel 502 is structured to be resiliently deformable so as to recover its planar shape after being bent under certain loading conditions. In some embodiments, the first panel 502 includes a frame extending along its outer border 504 and inward thereof. In some such embodiments, the distal arm portion 308 is connected to the frame. In some such embodiments, the frame and the adjustable arm 302 form an integral piece.

The panel assembly 400 further comprises a second panel 508. The second panel 508 is capable of blocking a second amount of incident UV radiation. The second panel 508 is constructed of the same material as the first panel 502, and is therefore capable of blocking at least 93.3% of incident UV radiation, i.e., a UPF rating of 15.

Figure 10:
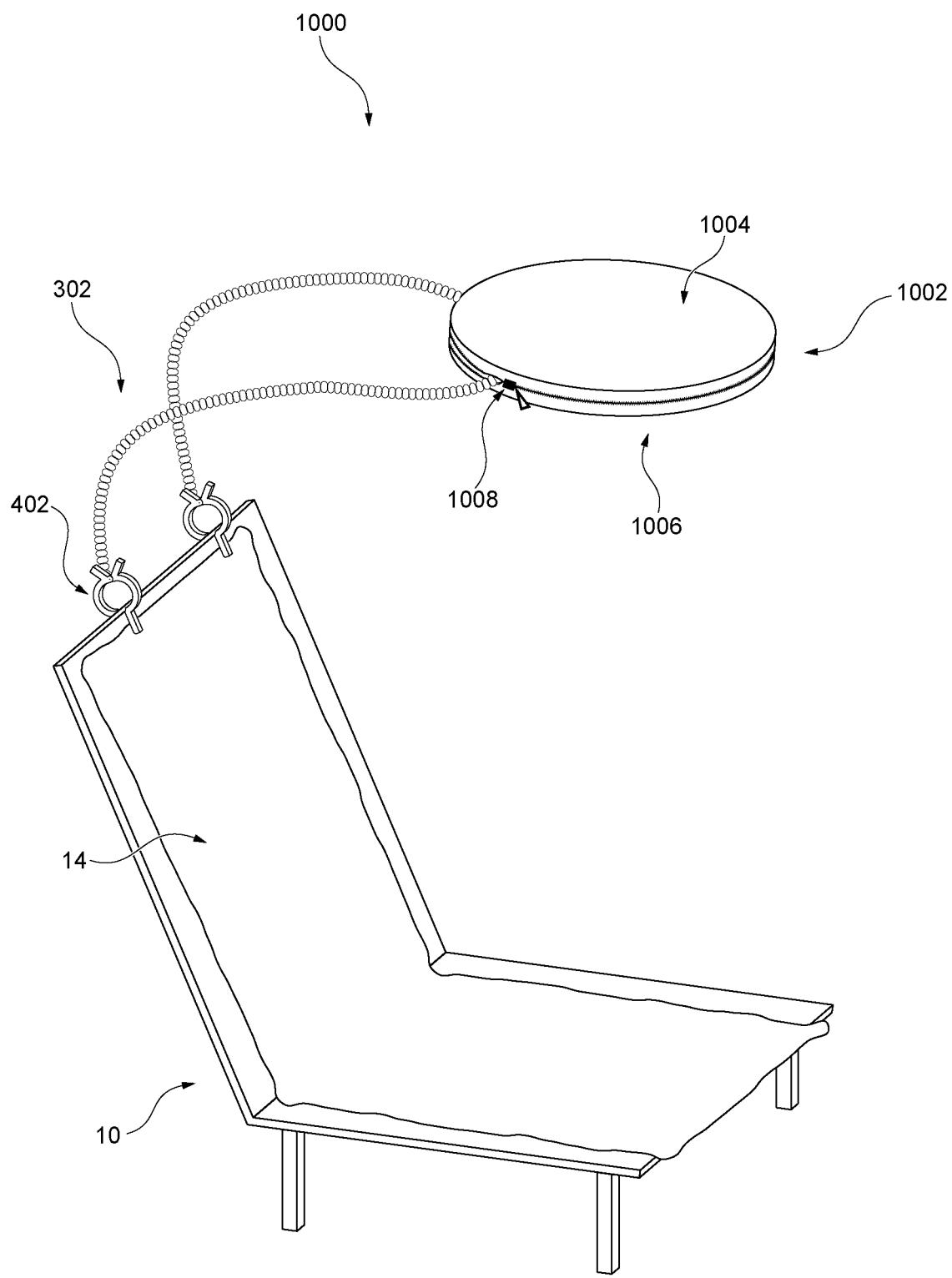
FIG. 10 is a perspective view taken from a front, right, top side of a solar radiation mitigation system according to a sixth embodiment of the present technology, shown mounted to a chair.
Figure 11:
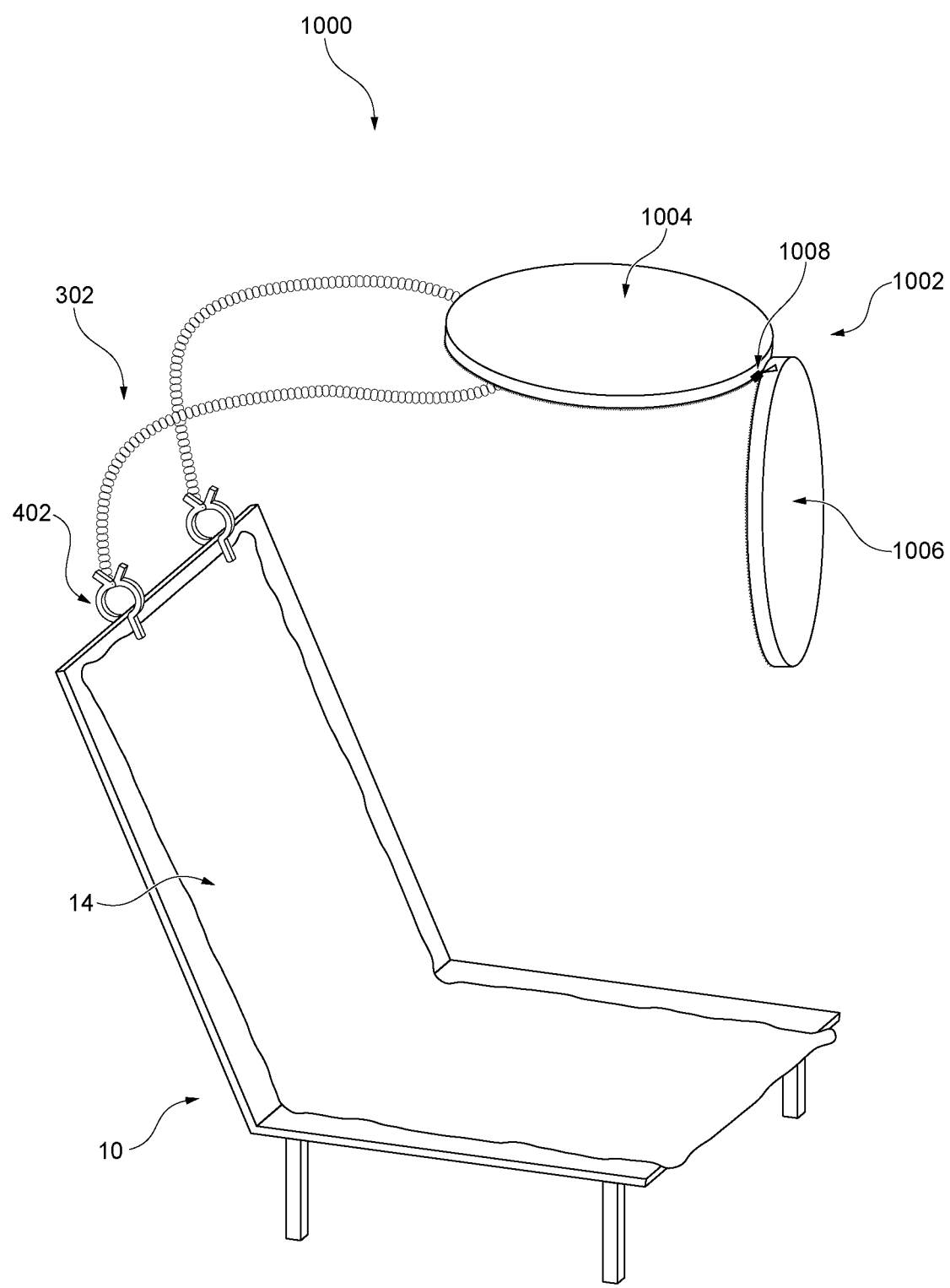
FIG. 11 is a perspective view taken from a front, right, top side of the solar radiation mitigation system of FIG. 10, shown with a second panel in a deployed configuration.

The second panel 508 is detachably attachable to the first panel 502 via connectors 510. The connectors 510 are disposed onto a top surface 512 of the second panel 508 and a alongside a bottom surface 514 of the first panel 502, such that the top and bottom surfaces 512, 514 are alongside one another when the panels 502, 508 are attached. Each panel 502, 508 has a pair of diametrically-opposed connectors 510*a*, 510*b*, disposed inwardly adjacent to their respective outer border 504. In this embodiment, the connectors 510 are Velcro™ connectors 516. Alternatively, it is contemplated that other types of connectors 510 may be used, including snap fasteners (as shown in FIG. 3), magnets and a zipper (as shown in FIGS. 10 and 11).

When the second panel 508 is attached to the first panel 502, the first and second panels 502, 508 are in operational relation. In this configuration, the panel assembly 200 is capable of blocking a combined amount of radiation being greater than the first and the second amounts of radiation. In this embodiment, the combined amount is greater than 98% of incident UV radiation, i.e., a UPF rating of 50+. It is contemplated that when used in an outdoor setting under normal natural day-time lighting conditions, the amount of radiation in the visible light spectrum let through is lesser in comparison to when the first panel 502 is used without the second panel 508.

When the second panel 508 is attached to the first panel 502, the first and second panels 502, 508 are in an operational relation. The adjustable arm 302 is structured to be capable of supporting the panel assembly 200 via the distal portion 306 when the first and second panels 502, 508 are in the operational relation. In use, the clamp 402 is connected to the chair 10 in which a user is sitting. The user may then adjust the arm 302 so as to position the first panel 502 between the user and the sun and to orient a top surface 514 of the first panel toward the sun. It is contemplated that such adjustments may be performed single-handedly, while the user remains seated on the chair 10, as needed over time according to the displacement of the sun. At any time, the user may selectively increase the portion of incident solar radiation being blocked by the solar radiation mitigation system 100 by attaching the second panel 508 to the first panel 502. Under certain circumstances, such as when it may be desirable for the user to favor visibility of the surroundings (e.g., monitoring a child, watching the sunset) or exposure to solar radiation in order to tan, the user may selectively decrease the portion of incident solar radiation being blocked by the solar radiation mitigation system 100 by detaching the second panel 508 from the first panel 502.

It is contemplated that when the second panel 508 is detached from the first panel 502, the second panel 508 may be used as a manual fan or as a flying disc toy.

In this embodiment, the first and second panels 502, 508 each have disk-like shapes. It is contemplated that, in other embodiments, at least one of the first and second panels 502, 508 could have a different shape such as obround, oval, trapezoidal, rectangular, etc.

Figure 2:
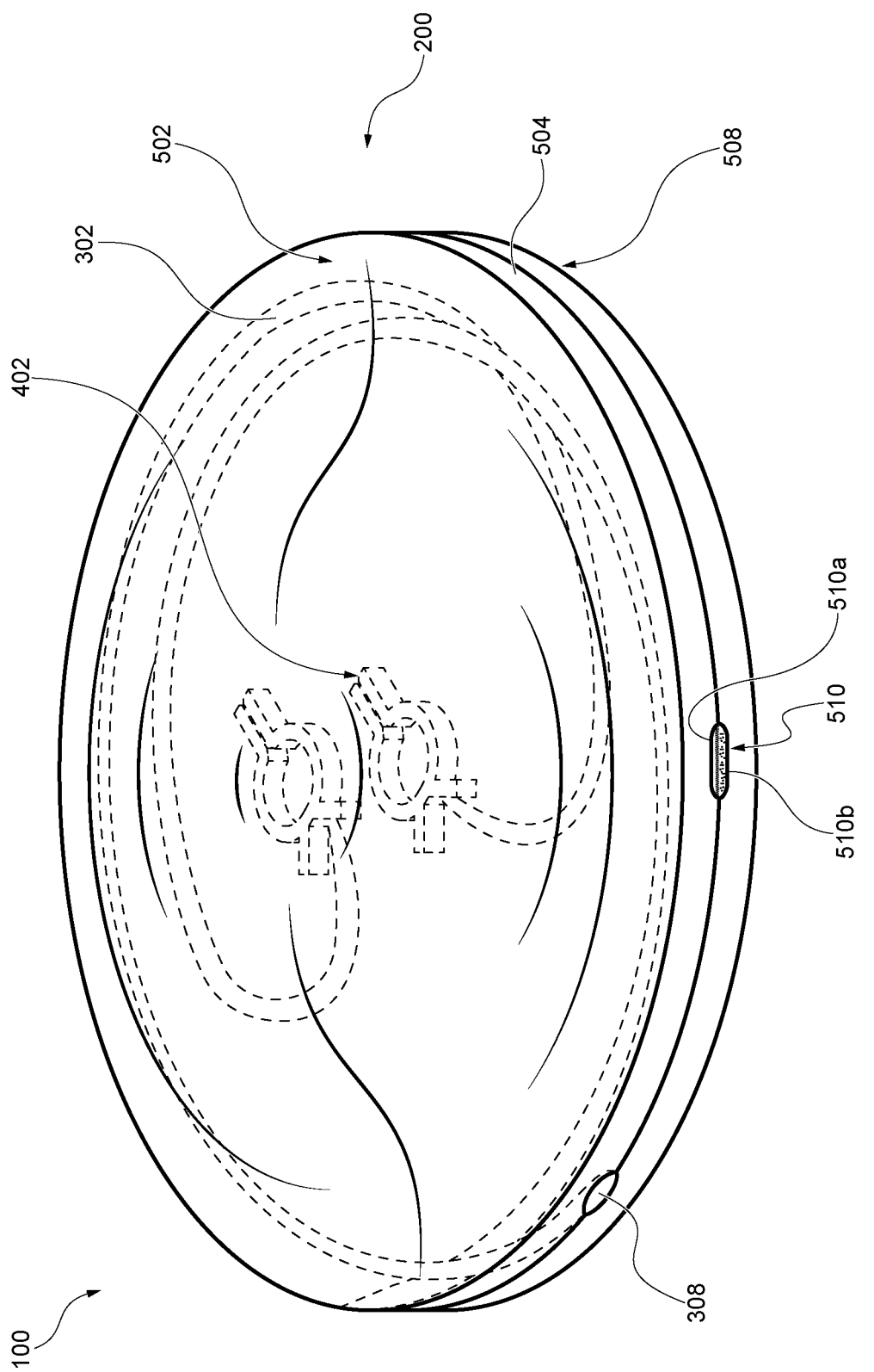
FIG. 2 is a perspective view taken from a rear, right, top side of the solar radiation mitigation system of FIG. 1, shown in a stowed configuration.

In FIG. 2, the solar radiation mitigation system 100 is shown in a stowed configuration. The clamp 402 is unattached, and is coiled with the adjustable arm 302 inward of the outer border 504 of the first panel 502. The second panel 508 is attached to the first panel 502, thereby forming a sleeve containing the adjustable arm 302 and clamp 402. In this configuration, the first and second panels 502, 508 are slightly bulged outward of the plane 12 (not shown) due to the space occupied by the arm 302 and the clamp 402 and to the connectors 510*a*, 510*b* holding the panels 502, 508 in place. It is contemplated that the panels 502, 508 return to a planar shape when the arm 302 and the clamp 402 are removed therebetween or when the connectors 510*a*, 510*b* are detached from one another.

Turning now to FIG. 3, a solar radiation mitigation system 600 according to a second embodiment of the present technology is shown. A panel assembly 602 comprises a first panel 604 and a second panel 606. The second panel 606 is detachably attachable to the first panel 604 alongside a top surface 608 thereof via connectors 610. In this embodiment, the connectors 610 are snap fasteners 610. The first panel 604 has two pairs of diametrically-opposed snap fasteners 610*a*. The second panel 606 has two pairs of diametrically-opposed snap fasteners 610*b*. In this embodiment, the snap fasteners 610*b* protrude from a top surface 612 of the second panel 606, although it does not have to be the case. Any one of the snap fasteners 610*a* is detachably attachable to any one of the snap fasteners 610*b*. On each panel 604, 606, the pairs of snap fasteners 610*a*, 610*b* are respectively angularly offset by 90 degrees. The snap fasteners 610*a*, 610*b* respectively disposed in a corresponding pattern, such that when a one of the snap fasteners 610*a* is connected to a one of the snap fasteners 610*b*, a remainder of the snap fasteners 610*a* is connectable to a remainder of the snap fasteners 610*b*. In this embodiment, the pattern is a circular pattern, although it is contemplated that it does not have to be the case.

Figure 4:
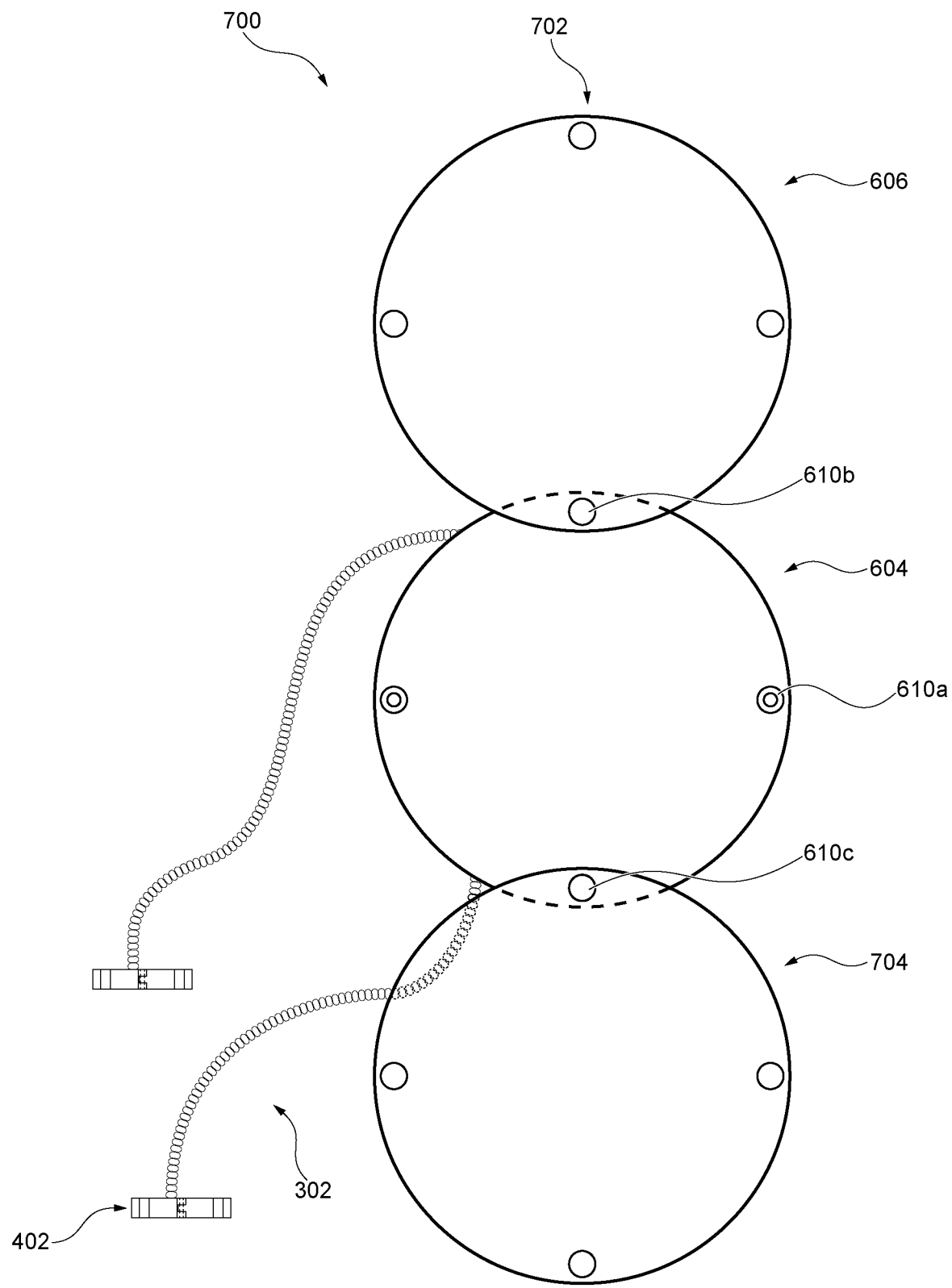
FIG. 4 is a top plan view of a solar radiation mitigation system according to a third embodiment of the present technology, shown with a second panel and a third panel thereof being in a deployed configuration with respect to a first panel thereof.

Referring to FIG. 4, a solar radiation mitigation system 700 according to a third embodiment of the present technology is shown. A panel assembly 702 comprises first, second and third panels 604, 606, 704. The third panel 704 is capable of blocking a third amount of incident UV radiation. The second panel 606 is constructed of the same material as the first panel 604, and is therefore capable of blocking at least 93.3% of incident UV radiation, i.e., a UPF rating of 15. When the second panel 606 is attached to the first panel 604 and the third panel 704 is attached to the first panel 604, the first, second and third panels 604, 606, 704 are in an operational relation (not shown). The adjustable arm 302 is structured to be capable of supporting the panel assembly 702 via the distal portion 306 when the first, second and third panels 604, 606, 704 are in the operational relation. In this configuration, the panel assembly 702 is capable of blocking a combined amount of radiation being greater than the first, second and third amounts of radiation. In this embodiment, the combined amount is greater than 98% of incident UV radiation, i.e., a UPF rating of 50+. It is contemplated that when the panel assembly 702 used in an outdoor setting under normal natural day-time lighting conditions, the amount of radiation in the visible light spectrum let through is lesser in comparison to when the first panel 604 is used without the second panel 606 and/or without the third panel 704. In use, the user may selectively increase the portion of incident solar radiation being blocked by the solar radiation mitigation system 700 by attaching at least one of the second panel 606 and the third panel 704 to the first panel 604. Under certain circumstances, such as those described hereinabove, the user may selectively decrease the portion of incident solar radiation being blocked by the solar radiation mitigation system 700 by detaching at least one of the second panel 606 and the third panel 704 from the first panel 604.

In this embodiment, the first panel 604 has connectors 610a and the second and third panels 508, 704 have connectors 610b. On each panel 604, 606, 704, two pairs of diametrically-opposed connectors 610a, 610b are disposed at a 90-degree angle from one another. On the first panel 604, the connectors 610a are disposed on front, rear, left and right portions of the top surface 608. As shown in FIG. 4, the panel assembly 702 may be configured in a deployed configuration, in which a one connector 610b of the second panel 606 and a one connector 610c of the third panel 704 may be respectively connected to the left and the right connectors 610a of the first panel 604, or vice-versa. It is contemplated that this configuration desirably increases the area which the panel assembly 702 is capable of shielding from incident solar radiation.

In some embodiments, at least one of the first, second and third panels 604, 606, 704 is constructed of a material different than the others. In some such embodiments, the at least one of the first, second and third panels 604, 606, 704 is capable of blocking an amount of incident solar radiation that is different than the others. In some such embodiments, the first, second and third panels 604, 606, 704 are constructed of different materials, and are capable of blocking different amounts of incident solar radiation.

In some embodiments, at least one of the second and third panels 606, 704 may be used as a manual fan or as a flying disc toy when detached from the first panel 604.

Figure 5:
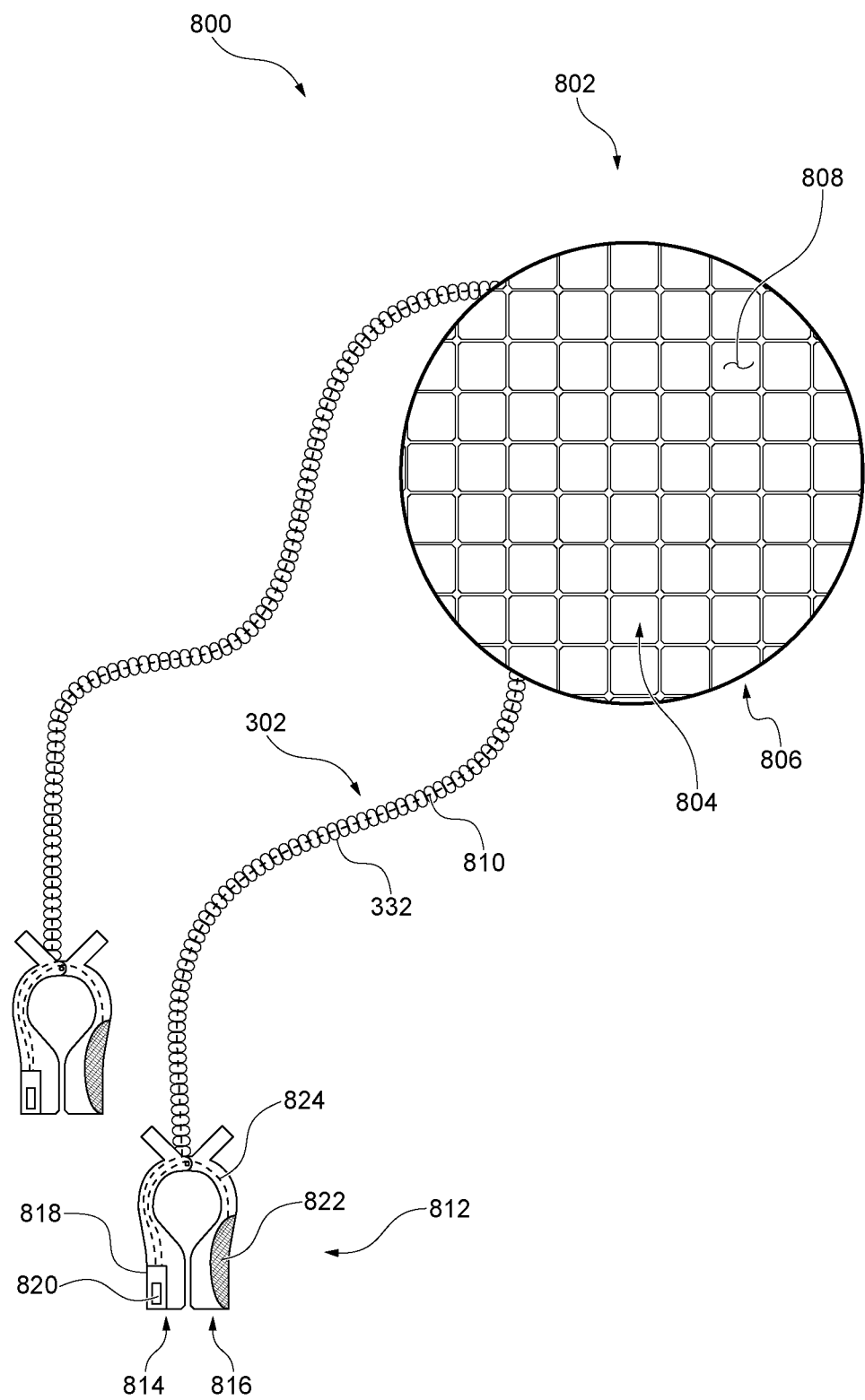
FIG. 5 is a right side elevation view of a solar radiation system according to a fourth embodiment of the present technology, comprising a first panel including a solar panel on an outward surface thereof, and comprising clamps including a speaker and a battery.

Referring to FIG. 5, a solar radiation mitigation system 800 according to a fourth embodiment of the present technology is shown. A panel assembly 802 comprises a first panel 804 and a second panel 806. The second panel 806 is detachably attached to the first panel 804 alongside a top surface 608 thereof via connectors (not shown). In this embodiment, the connectors are magnets. The first panel 804 has two pairs of diametrically-opposed connectors. The second panel 806 has two pairs of diametrically-opposed connectors. The connectors are disposed on the first and second panels 804, 806 in a corresponding pattern, such that when a one of the connectors of the first panel 804 is connected to a one of the connectors of the second panel, a remainder of the connectors of the first panel 804 is connectable to a remainder of the connectors of the second panel 806. In this embodiment, the pattern is a circular pattern, although it is contemplated that it does not have to be the case.

The first panel 804 includes a photovoltaic solar panel 808 defining a top surface thereof. The solar panel 808 is electronically connected via wiring 810 running inside an outer jacket 332 of an adjustable arm 302. The arm 302 extends from the panel assembly 802 to a clamp 812. The clamp 812 comprises a first clamp portion 814 and a second clamp portion 816. The first clamp portion 814 comprises a battery 818 enclosed therein. The battery 818 is electronically connected to the solar panel 808 via the wiring 810 so as to store energy generated by the solar panel 808. The first clamp portion 814 also comprises a port 820 (e.g., a USB port) structured for connecting at least one portable electronic device (not shown). The battery 818 is electronically connected to the port 820 such that the at least one portable electronic device may be powered by the battery 818. The second clamp portion 816 houses a speaker 822. The speaker 822 is electronically connected to the battery 818 and to the port 820 via wiring 824 so as to be controllable via the at least one portable electronic device to produce sound. In other embodiments, the speaker 822 is electronically connectable to the at least one portable electronic device via a wireless communication protocol such as Bluetooth™ and Wi-Fi. As speakers are not central to the present technology, the speaker will not be described in further detail.

In other embodiments, the speaker 822 is connected to a speaker arm. The speaker arm is structured to be adjustable so as to position and orient the speaker with respect to the furniture element when the solar radiation mitigation system 800 is mounted thereto. The speaker arm is connected to one of the arm 302, the clamp 402 or a speaker clamp.

Referring to FIGS. 6 to 9, a solar radiation mitigation system 900 according to a fifth embodiment of the present technology is shown. A panel assembly 902 comprises a first panel 904 and a second panel 906. The second panel 906 is detachably attached to the first panel 904 alongside a bottom surface (not shown) thereof via connectors (not shown). In this embodiment, the connectors are magnets. The first panel 904 has two pairs of diametrically-opposed connectors. The second panel 906 also has two pairs of diametrically-opposed connectors. The connectors are disposed on the first and second panels 904, 906 in a corresponding pattern, such that when a one of the connectors of the first panel 904 is connected to a one of the connectors of the second panel, a remainder of the connectors of the first panel 904 is connectable to a remainder of the connectors of the second panel 906. In this embodiment, the pattern is a circular pattern, although it is contemplated that it does not have to be the case.

The first panel 904 is constructed of a material capable of blocking a first amount of incident UV radiation being at least 93.3%, i.e., an Ultraviolet Protection Factor (UPF) rating of 15. The material also has at least one of the following characteristics: high-density weave, dark color, UV-absorptive coating, and water repellence. It is contemplated that the material lets through a material amount of radiation in the visible light spectrum, and is therefore see-through when used in an outdoor setting under normal natural day-time lighting conditions.

The first panel 904 is structured as an optical linear polarizer (i.e., an optical linear filter) capable of confining incident radiation in the visible light spectrum along a first polarizing orientation 908 (shown schematically).

The second panel 906 is constructed of the same material as the first panel 904, and is therefore capable of blocking at least 93.3% of incident UV radiation, i.e., a UPF rating of 15. The second panel 906 is structured as an optical linear polarizer capable of confining incident radiation in the visible light spectrum along a second polarizing orientation 910 (shown schematically).

Figure 9:
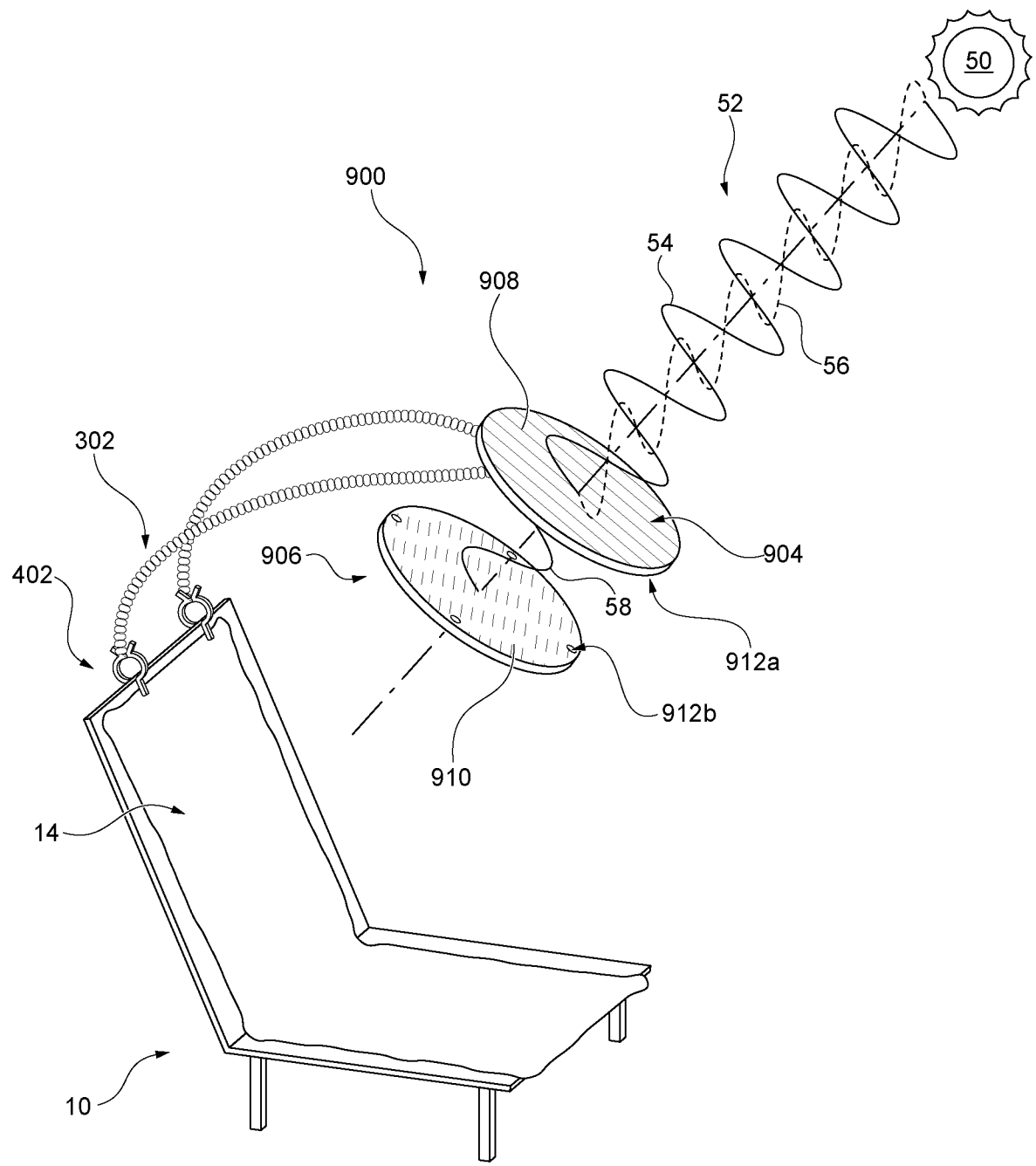
FIG. 9 is a perspective view taken from a front, right, top side of the solar radiation mitigation system of FIG. 6, shown mounted to a chair, the first and second panels facing incident solar radiation, the first-panel and second-panel polarization orientation being orthogonal.

When the second panel 906 is attached to the first panel 904, the first and second panels 904, 906 are in an operational relation. As shown in FIGS. 8 and 9, the first and second panels 904, 906 are in the operational relation and the panel assembly 902 is oriented toward the sun 50 and facing incident solar radiation 52 radiating therefrom. The solar radiation 52 is schematically shown as being decoupled into a first oriented radiation portion 54 and a second oriented radiation portion 56.

Figure 6:
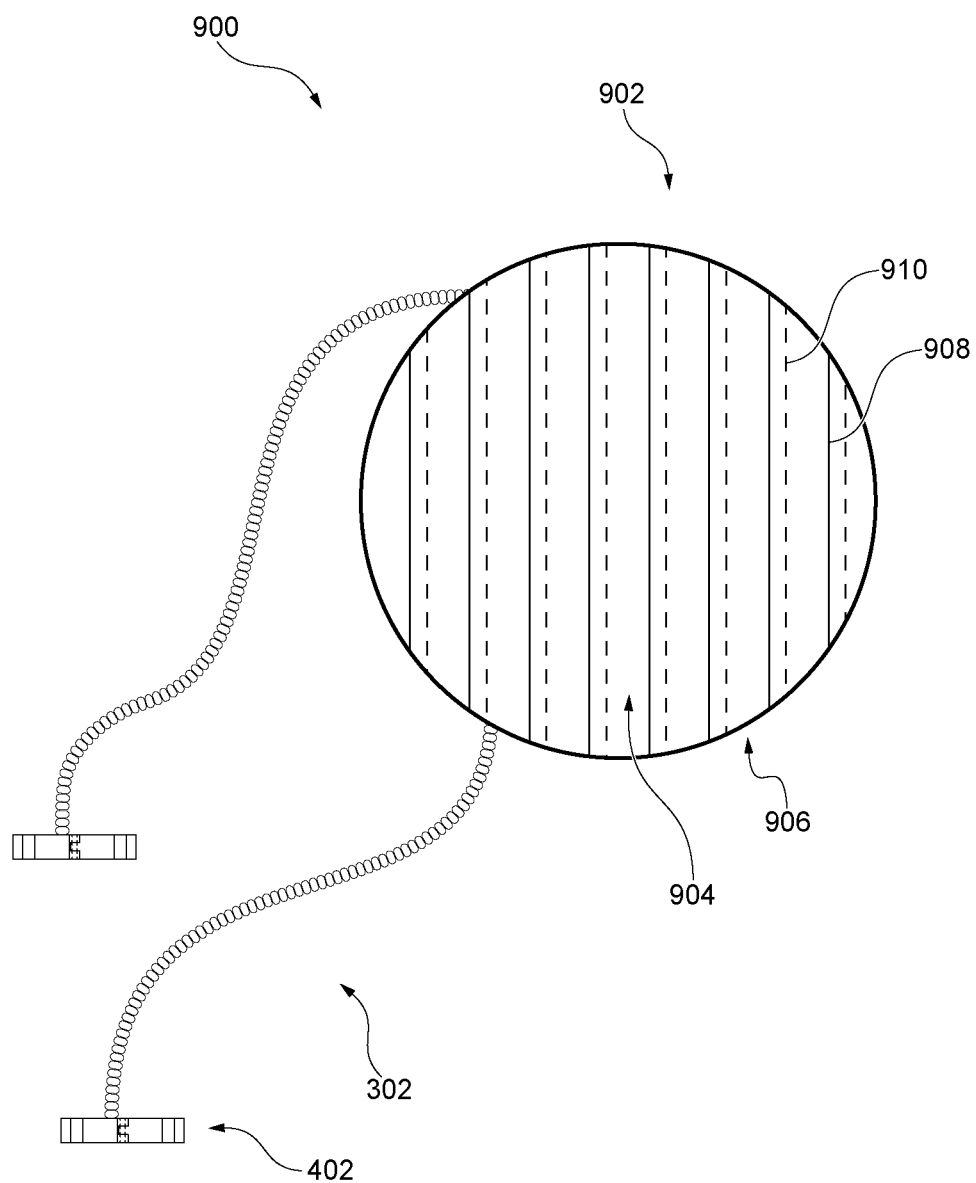
FIG. 6 is a top planar view of a solar radiation mitigation system according to a fifth embodiment of the present technology, comprising a first panel having a first-panel polarization orientation, and a second panel having a second-panel polarization orientation, shown with the first-panel and second-panel polarization orientations being parallel.

In FIGS. 6 and 8, the second panel 906 is positioned with respect to the first panel 904 such that the first and second polarizing orientations 908, 910 are in alignment. The first oriented radiation portion 54 is in alignment with the first and second polarizing orientations 908, 910, and the second oriented radiation portion 56 is orthogonal thereto. In this configuration, the incident solar radiation 52 is polarized such that the first oriented radiation portion 54 partially at least one of absorbed and reflected by the first panel 904 and a portion 58 of the first oriented radiation portion 54 passes through the first and second panels 904, 906. The second oriented radiation portion 56 is at least one of absorbed and reflected by the first panel 904 and does not pass therethrough.

Figure 7:
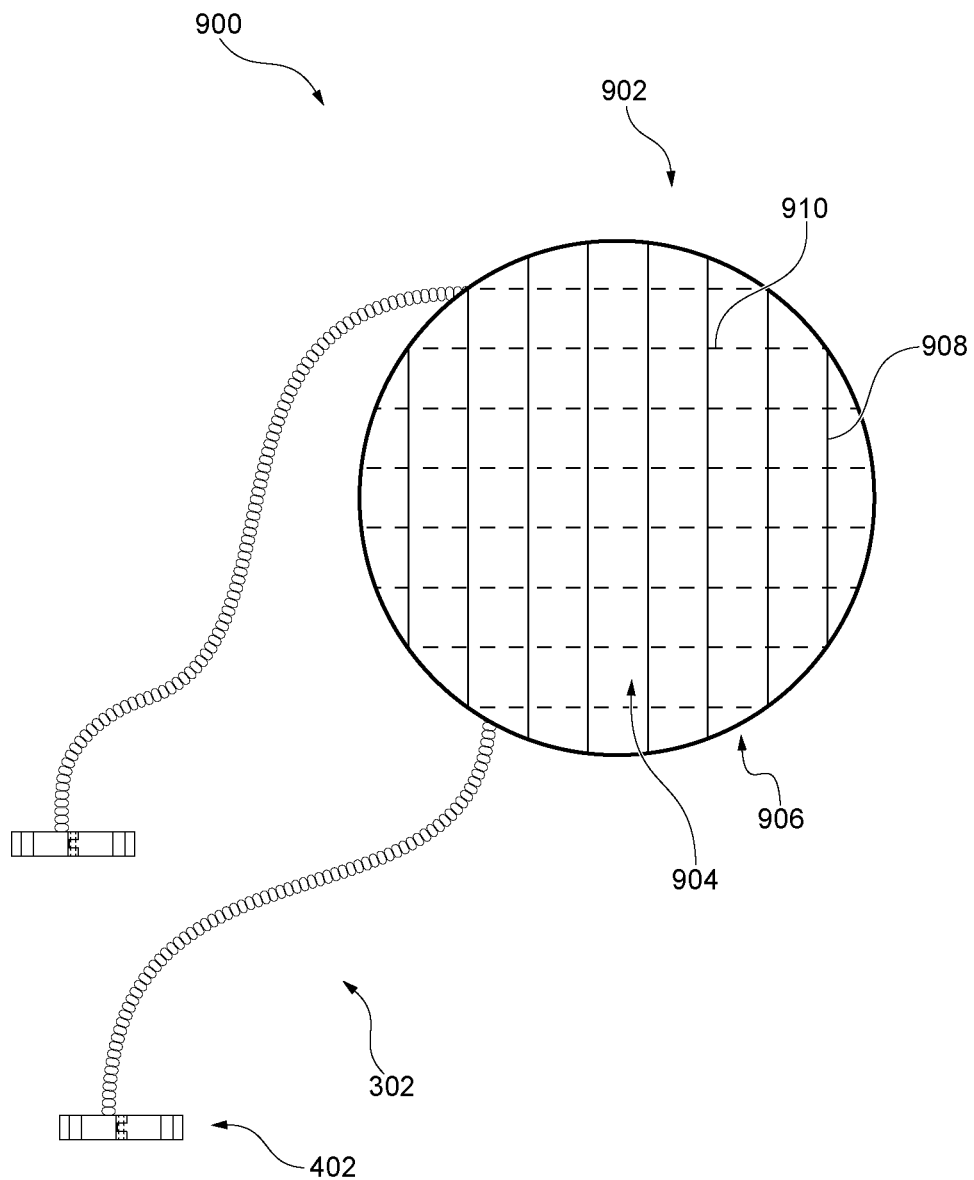
FIG. 7 is a top planar view of the solar radiation mitigation system of FIG. 6, shown with the first-panel and second-panel polarization orientations being orthogonal.

In FIGS. 7 and 9, the second panel 906 is positioned with respect to the first panel 904 such that the first and second polarizing orientations 908, 910 are orthogonal. The first oriented radiation portion 54 is in alignment with the first polarizing orientation 908, and the second oriented radiation portion 56 is in alignment with the second polarizing orientation 910. In this configuration, the incident solar radiation 52 is polarized such that the first oriented radiation portion 54 partially at least one of absorbed and reflected by the first panel 904. The portion 58 of the first oriented radiation portion 54 passes through the first panel 904 and is at least one of absorbed and reflected by the second panel 906 and does not pass therethrough. The second oriented radiation portion 56 is at least one of absorbed and reflected by the first panel 904 and does not pass therethrough.

In use, the user may selectively increase the portion of incident solar radiation 52 being at least one of absorbed and reflected by the solar radiation mitigation system 900 by attaching the second panel 906 to the first panel 904 in the operational relation. Under certain circumstances such as those described hereinabove, the user may selectively increase the portion of incident solar radiation 52 being at least one of absorbed and reflected by the solar radiation mitigation system 900 by pivoting the second panel 906 with respect to the first panel 904 so as to position the second polarizing orientation 910 with respect to the first polarizing orientation 908 at an angle ranging from 0 degrees to 90 degrees.

In some embodiments, the first and second panels are connectable to one another via a pivotable connector for pivoting the second panel with respect to the first panel when in the operational relation.

In some other embodiments, at least one of the first and the second panel is structured as a polarizer of a different type, such as a circular polarizer.

Referring to FIGS. 10 and 11, a solar radiation mitigation system 1000 according to a sixth embodiment of the present technology is shown. The solar radiation system 1000 is shown mounted to a chair 10. The solar radiation mitigation system 1000 comprises a panel assembly 1002, a clamp 402 and an adjustable arm 302 extending from the clamp 402 to the panel assembly 1002. The clamp 402 is attached to a backrest of the chair 10 so as to mount the solar radiation mitigation system 1000 thereto and to retain a towel 14 thereon. The panel assembly includes a first panel 1004 and a second panel 1006. The second panel 1006 is detachably attached to the first panel 1004 alongside a bottom surface (not shown) thereof via a connector being a zipper 1008 closure. As shown on FIG. 10, the zipper 1008 is partially open rearwardly. This allows the adjustable arm 302, being connected to the first panel 1004, to extend rearwardly outwardly from between the first and second panels 1004, 1006 to the clamp 402. It is contemplated that when the zipper 1008 is closed, the first and second panels 1004, 1006 form a sleeve in which the arm 302 and the clamp 402 may be stored.

Turning now to FIG. 11, the zipper 1008 is further partially open, such that the second panel 1006 hangs downward with respect to a front portion of the first panel 1004. It is contemplated that such a configuration may be desirable to at least partially block direct and indirect solar radiation. For example, the first panel 1004 may be oriented so as to face direct solar radiation. In this configuration, the second panel 1006 may be advantageously positioned to face indirect solar radiation, such as radiation reflected by water or by a window.

Figure 12:
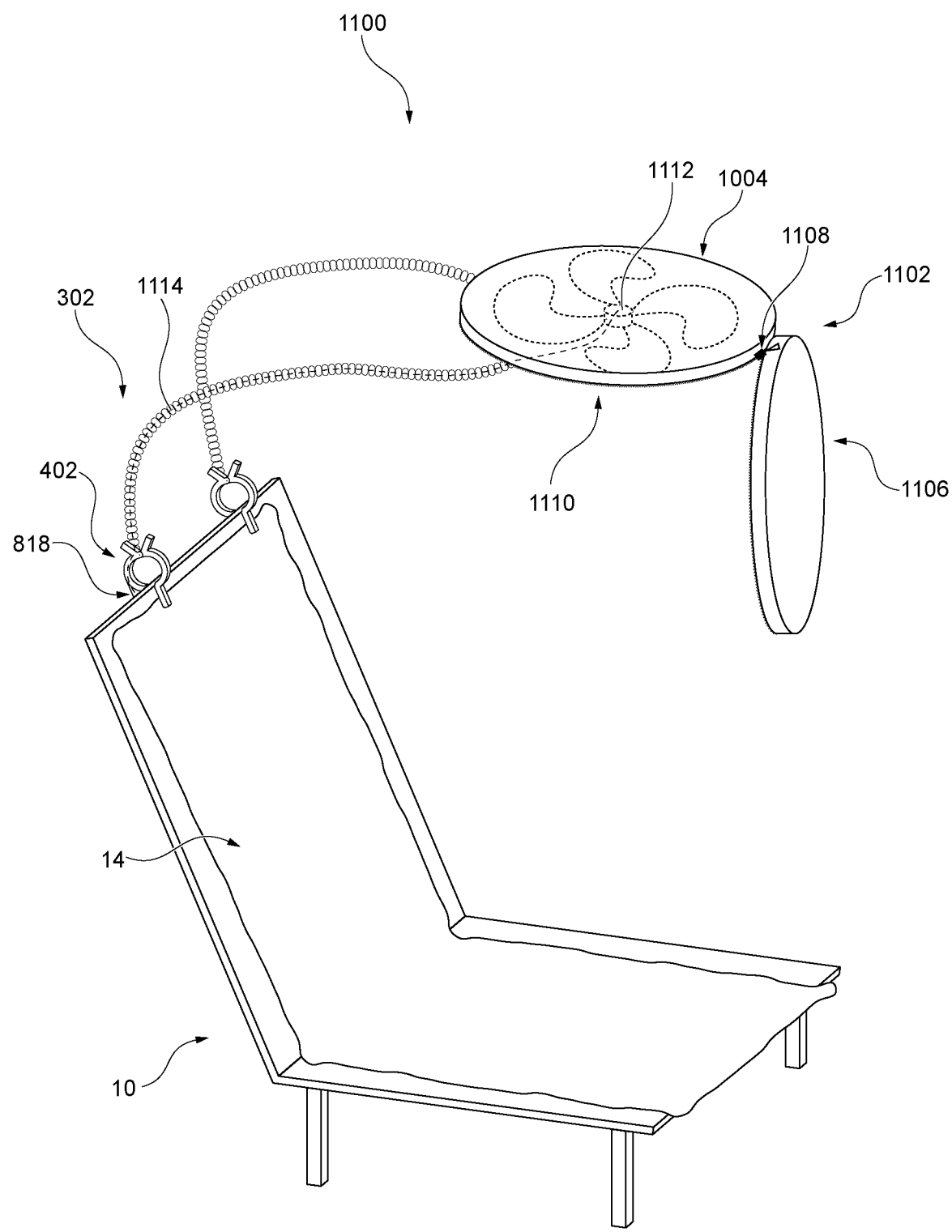
FIG. 12 is a perspective view taken from a front, right, top side of a solar radiation mitigation system according to a seventh embodiment of the present technology, comprising an electrical fan connected to a first panel thereof, shown mounted to a chair.

Referring to FIG. 12, a solar radiation mitigation system 1100 according to a seventh embodiment of the present technology is shown. The solar radiation system 1100 is shown mounted to a chair 10. The solar radiation mitigation system 1100 comprises a panel assembly 1102, a clamp 402 and an adjustable arm 302 extending from the clamp 402 to the panel assembly 1102. The clamp 402 is attached to a backrest of the chair 10 so as to mount the solar radiation mitigation system 1100 thereto and to retain a towel 14 thereon. The panel assembly includes a first panel 1104 and a second panel 1106. The second panel 1106 is detachably attached to the first panel 1104 alongside a bottom surface (not shown) thereof via a connector being a zipper 1108 closure. The zipper 1108 is partially open such that the second panel 1106 hangs downward with respect to a front portion of the first panel 1104. The solar radiation mitigation system 1100 further includes an electric fan 1110 connected to the bottom surface of the first panel 1104 and oriented outwardly with respect thereto. The fan 1110 is actuable by an electric motor 1112. The motor 1112 is electrically connected via wiring 1114 to a battery 818 (not shown in detail) contained in the clamp 402 for powering the fan 1110. The clamp 402 further includes a switch (not shown) for selectively powering the fan. It is contemplated that when the zipper 1108 is closed, the first and second panels 1104, 1106 form a sleeve in which the arm 302, the clamp 402 and the fan 1110 may be stored.

In other embodiments, the fan 1110 and the motor 1112 are connected to a fan arm. The fan arm is structured to be adjustable so as to position and orient the fan with respect to the furniture element when the solar radiation mitigation system 1100 is mounted thereto. The fan arm is connected to one of the arm 302, the clamp 402 or a fan clamp.

Figure 13:
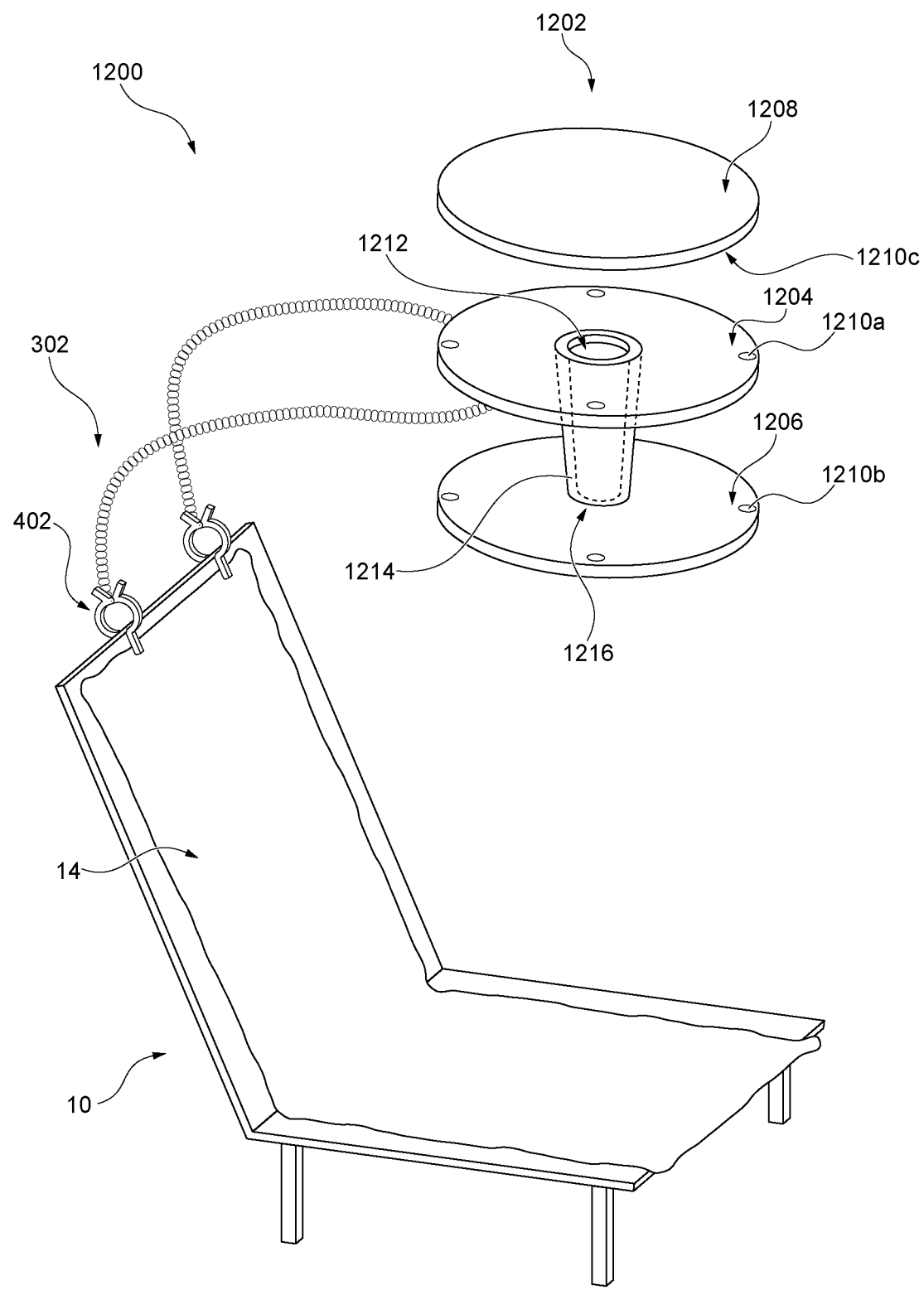
FIG. 13 is a perspective view taken from a front, right, top side of a solar radiation mitigation system according to a ninth embodiment of the present technology, comprising a refrigerable cup holder detachably attached to a first panel thereof, shown mounted to a chair.

Referring to FIG. 13, a solar radiation mitigation system 1200 according to an eight embodiment of the present technology is shown. In this embodiment, the solar radiation mitigation system 1200 comprises a panel assembly 1202 and a refrigerable cup holder 1212. The cup holder has an outer wall 1214 constructed at least in part of a refrigerable material. The panel assembly 1202 includes a first, a second and a third panel 1204, 1206, 1208. The second and third panels 1206, 1208 respectively have a set of connectors 1210*b*, 1210*c* being connectable to one of two sets of connectors 1210*a* of the first panel 1204 so as to be detachably attachable thereto. The two sets of connectors 1210*a* are disposed on opposing faces of the first panel 1204. The cup holder 1212 is detachably attachable to the first and second panels 1204, 1206. In FIG. 13, the second and third panels 1206, 1208 are shown detached from the first panel 1204. A top portion of the cup holder 1212 is shown attached to the first panel 1204 and a bottom portion 1216 of the cup holder 1212 is detachably attached to the second panel 1206 via a connector (not shown). It is contemplated that the cup holder 1212 may be detached to be refrigerated in a freezer or a portable cooler (not shown). It is also contemplated that, in some embodiments, the bottom portion 1216 is collapsible so as to be storable between the first and second panels 1204, 1206 when the second panel 1206 is attached to the first panel 1204.

In some embodiments, at least one of the second and third panels 1206, 1208 may be used as a manual fan or as a flying disc toy when detached from the first panel 1204.

In other embodiments, the solar radiation mitigation system 1200 comprises a plurality of cup holders 1212.

Figure 14:
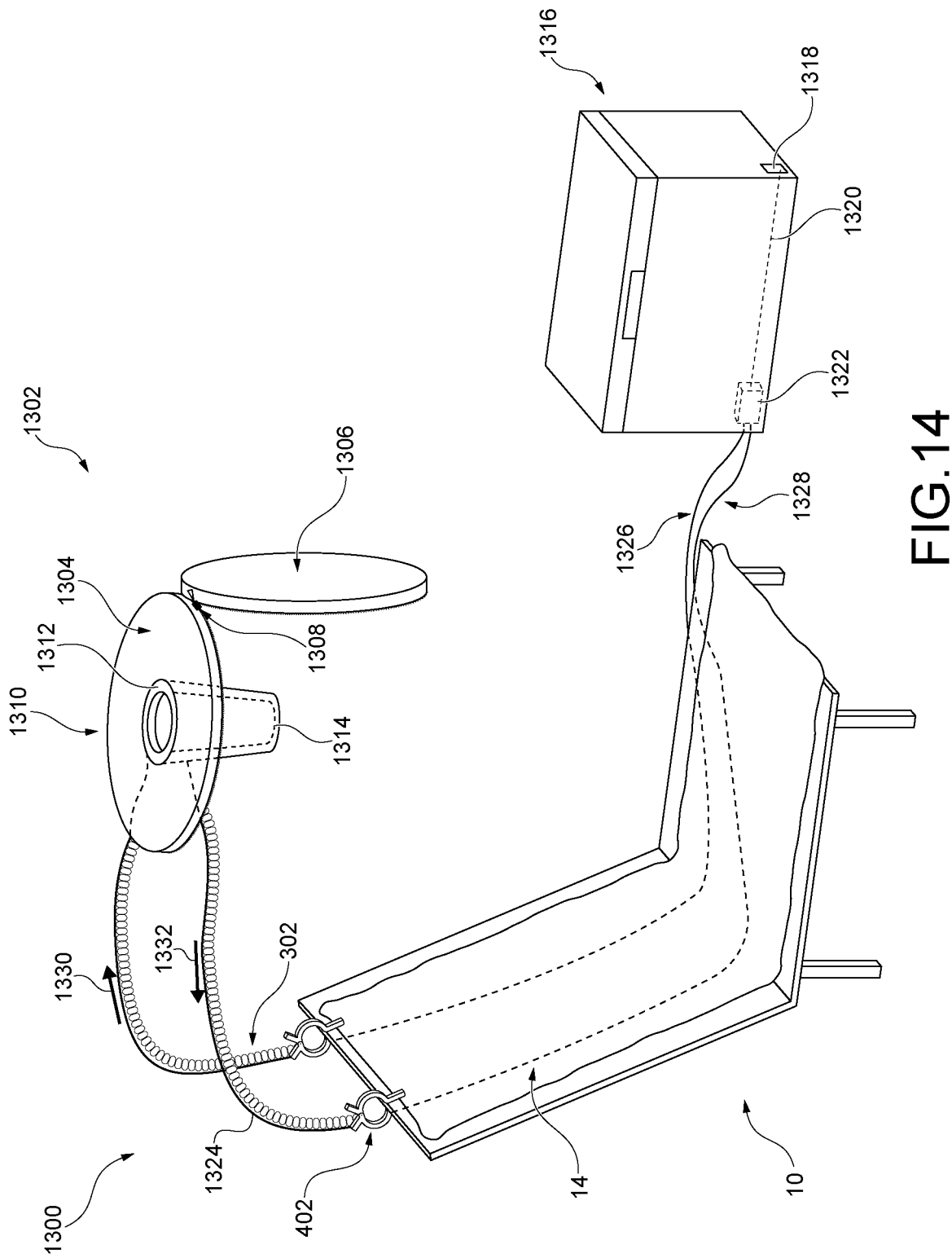
FIG. 14 is a perspective view taken from a front, right, top side of a solar radiation mitigation system according to an eight embodiment of the present technology, comprising a hydraulically-refrigerable cup holder connected to a first panel thereof, shown mounted to a chair.

Referring to FIG. 14, a solar radiation mitigation system 1300 according to a ninth embodiment of the present technology is shown. The solar radiation system 1300 is shown mounted to a chair 10. The solar radiation mitigation system 1300 comprises a panel assembly 1302, a clamp 402 and an adjustable arm 302 extending from the clamp 402 to the panel assembly 1302. The clamp 402 is attached to a backrest of the chair 10 so as to mount the solar radiation mitigation system 1300 thereto and to retain a towel 14 thereon. The panel assembly 1302 includes a first panel 1304 and a second panel 1306. The second panel 1306 is detachably attached to the first panel 1304 alongside a bottom surface (not shown) thereof via a connector being a zipper 1308 closure. The zipper 1308 is partially open such that the second panel 1306 hangs downward with respect to a front portion of the first panel 1304. The solar radiation mitigation system 1300 further includes a hydraulically refrigerable cup holder 1310. The cup holder 1310 has a top portion 1312 connected to the first panel 1304 and a hollow, concave portion 1314 structured for receiving a beverage container (not shown). The hollow portion 1314 is fluidly connected to a cooler 1316. The cooler 1316 comprises a power connector 1318, which is electrically connected via wiring 1320 to a pump 1322. The pump 1322 is fluidly connected to the hollow portion 1314 of the cup holder 1312 via a conduit 1324 for circulating a cooling fluid thereto (via conduit inlet 1326) and therefrom (via conduit outlet 1328) for cooling the beverage container received in the cup holder 1310. Upstream and downstream circulation of fluid through the conduit 1324 is illustrated via arrows 1330, 1332.

In other embodiments, the solar radiation mitigation system 1300 comprises a plurality of cup holders 1310.

Figure 15:
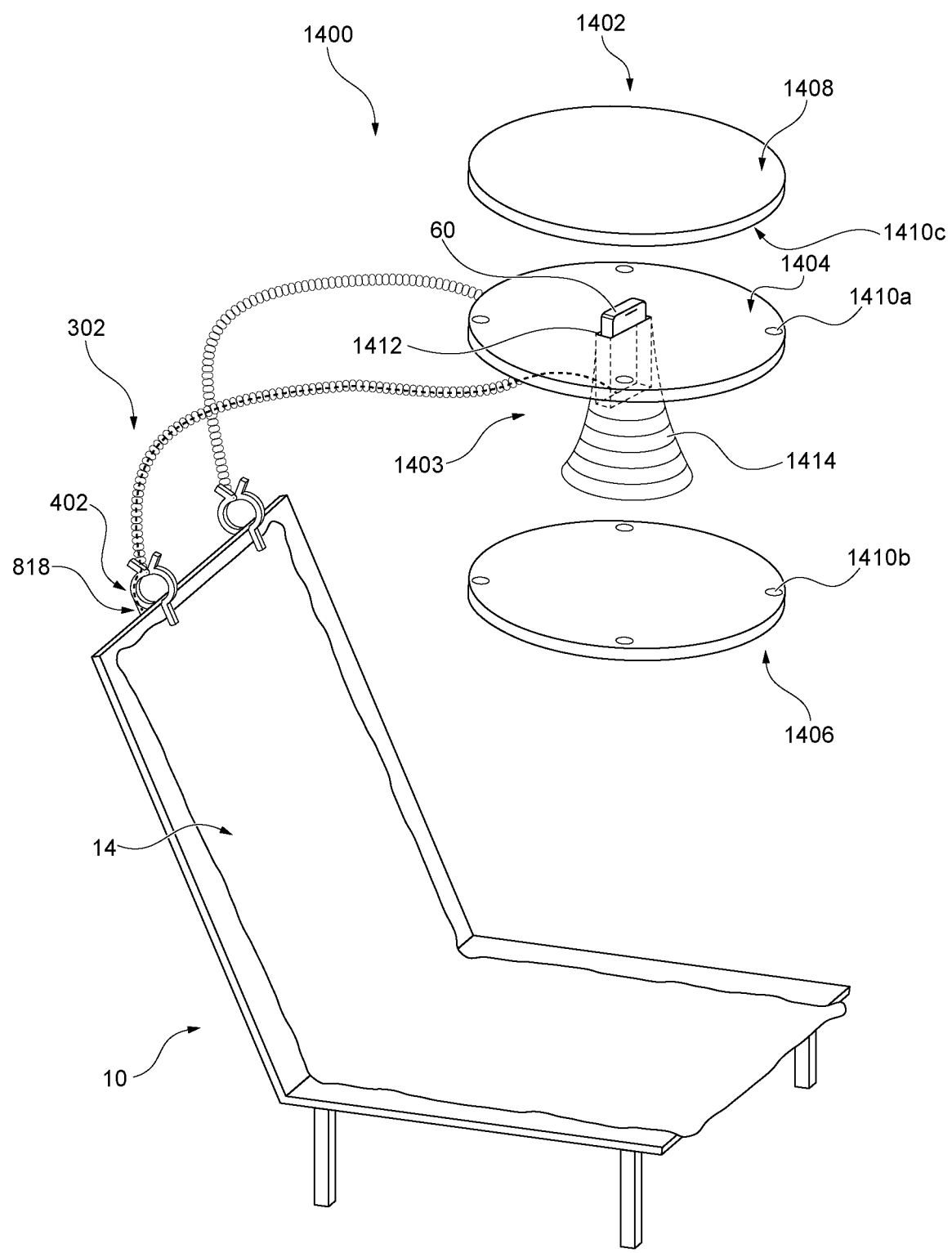
FIG. 15 is a perspective view taken from a front, right, top side of a solar radiation mitigation system according to a tenth embodiment of the present technology, comprising a speaker assembly for a portable electronic device.

Referring to FIG. 15, a solar radiation mitigation system 1400 according to a tenth embodiment of the present technology is shown. In this embodiment, the solar radiation mitigation system 1400 comprises a panel assembly 1402 and a speaker assembly 1403. The panel assembly 1402 includes a first, a second and a third panel 1404, 1406, 1408. The second and third panels 1406, 1408 respectively have a set of connectors 1410*b*, 1410*c* being connectable to one of two sets of connectors 1410*a* of the first panel 1404 so as to be detachably attachable thereto. The two sets of connectors 1410*a* are disposed on opposing faces of the first panel 1404. In FIG. 15, the second and third panels 1406, 1408 are shown detached from the first panel 1404. The speaker assembly 1403 comprises a docking portion 1412 being attached to the first panel 1404 and extending downwardly of a top surface thereof. The docking portion 1412 is structured for receiving a portable electronic device 60 such as a phone 60, as shown. The docking portion 1412 is electrically connected to a battery 818 (not shown in detail) connected to the clamp 402, and electronically connectable to the phone 60 for powering the phone 60. The speaker assembly 1403 further includes a sound amplification portion 1414 extending downwardly of the docking portion 1412. The sound amplification portion 1414 is structured to be collapsible toward the first panel 1404 so as to be storable between the first and second panels 1404, 1406 when the second panel 1406 is attached to the first panel 1404. The docking portion 1412 and the sound amplification portion 1414 are structured and arranged one with respect to the other such that when the phone 60 is received in the docking portion 1412, loudspeakers (not shown) of the phone 60 are directly exposed inside of the sound amplification portion 1414. It is contemplated that in this configuration, sound generated by the phone 60 via the loudspeakers is amplified via the sound amplification portion 1414.

In some embodiments, at least one of the second and third panels 1406, 1408 may be used as a manual fan or as a flying disc toy when detached from the first panel 1404.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A solar radiation mitigation system mountable to a furniture element, the solar radiation mitigation system comprising:
   a panel assembly comprising:
      a first panel constructed of a material capable of blocking a first amount of solar radiation, and
      a second panel in operational relation with the first panel and detachably connected thereto, the second panel being made from a material capable of blocking a second amount of solar radiation;
      wherein the panel assembly blocks a combined amount of solar radiation greater than the first amount and the second amount of solar radiation when the second panel is in operational relation with the first panel;
   at least one adjustable arm comprising:
      a distal arm connector connected to the first panel,
      a proximal arm connector structured to be detachably attachable to the furniture element for mounting the solar radiation mitigation system to the furniture element, and an elongated member extending from the proximal arm connector to the distal arm connector, the elongated member being adjustable to position and orient the first panel with respect to the furniture element;

wherein the panel assembly and the at least one adjustable arm are arranged such that:

the first panel and the second panel form a sleeve, and when the proximal arm connector is unattached, the at least one adjustable arm is stowable within the sleeve.

2. The solar radiation mitigation system of claim 1, wherein, when in operational relation, the first panel and the second panel are superimposed.

3. The solar radiation mitigation system of claim 1, wherein the solar radiation mitigation system is an outdoor solar radiation mitigation system.

4. The solar radiation mitigation system of claim 3, wherein the furniture element is an outdoor furniture element.

5. The solar radiation mitigation system of claim 1, wherein at least one of the first and second panels includes an optical filter for selectively transmitting incident light.

6. The solar radiation mitigation system of claim 1, wherein, when in operative relation, the second panel adopts one of at least two angular positions with respect to the first panel.

7. The solar radiation mitigation system of claim 6, wherein the at least two angular positions include a first angular position and a second angular position.

8. The solar radiation mitigation system of claim 6, wherein the first angular position is orthogonal with respect to the second angular position.

9. The solar radiation mitigation system of claim 1, wherein the combined amount of solar radiation is at least 93.3% of solar radiation directly incident with respect to the panel assembly.

10. The solar radiation mitigation system of claim 1, wherein the combined amount of solar radiation is at least 96% of solar radiation directly incident with respect to the panel assembly.

11. The solar radiation mitigation system of claim 1, wherein the combined amount of solar radiation is at least 97.5% of solar radiation directly incident with respect to the panel assembly.

12. The solar radiation mitigation system of claim 1, wherein at least a portion of the second panel is a flying disc toy.

13. The solar radiation mitigation system of claim 1, further comprising a portable, electrically-powered fan, the fan being connected to the adjustable arm, the adjustable arm being adjustable to position and orient the fan with respect to the furniture element when the solar radiation system is mounted thereto.

14. The solar radiation mitigation system of claim 1, wherein the panel assembly further includes a photovoltaic system comprising:

a photovoltaic panel being attachable alongside and forming part of one of the first panel and the second panel, and a battery pack being electrically connected to the photovoltaic panel to store solar electricity generated by the photovoltaic panel, the battery pack being structured to be capable of powering a portable electronic device.

15. The solar radiation mitigation system of claim 1, wherein one of the first panel and the second panel defines a planar surface and includes at least one receptacle sized for receiving a beverage container, the at least one receptacle projecting outwardly of the planar surface.

16. The solar radiation mitigation system of claim 15, wherein the at least one receptacle is structured to be collapsible toward the planar surface.

17. The solar radiation mitigation system of claim 15, wherein the at least one receptacle has an outer portion and a connector disposed on the outer portion, the one of the first panel and the second panel being detachably attachable to a remaining one of the first panel and the second panel via the connector.

18. The solar radiation mitigation system of claim 15, wherein the panel assembly further includes a cooling conduit, the cooling conduit being fluidly connectable to a pump, the cooling conduit being structured to allow transferring of heat from the at least one receptacle to a fluid circulated along the cooling conduit by the pump.

19. The solar radiation mitigation system of claim 15, wherein the at least one receptacle is constructed of at least one material being a refrigerant material.

* * * * *